(12) United States Patent
Chen et al.

(10) Patent No.: US 11,421,997 B2
(45) Date of Patent: Aug. 23, 2022

(54) MAP CONSTRUCTION SYSTEM AND MAP CONSTRUCTION METHOD

(71) Applicant: Acer Incorporated, New Taipei (TW)

(72) Inventors: Jian-Yu Chen, New Taipei (TW); Tzu-Peng Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 342 days.

(21) Appl. No.: 16/836,938

(22) Filed: Apr. 1, 2020

(65) Prior Publication Data

US 2021/0262807 A1 Aug. 26, 2021

(30) Foreign Application Priority Data

Feb. 25, 2020 (TW) .................................. 109106033

(51) Int. Cl.
*G01C 21/32* (2006.01)
*G01S 17/89* (2020.01)
*G01S 17/86* (2020.01)
*G06T 7/73* (2017.01)
*G01S 7/48* (2006.01)

(52) U.S. Cl.
CPC ............ *G01C 21/32* (2013.01); *G01S 7/4808* (2013.01); *G01S 17/86* (2020.01); *G01S 17/89* (2013.01); *G06T 7/74* (2017.01); *G06T 2207/10028* (2013.01); *G06T 2207/30248* (2013.01)

(58) Field of Classification Search
CPC ............... G01C 21/32; G01C 21/3837; G01C 21/3848; G01S 17/86; G01S 17/89; G01S 7/4808; G06T 2207/10028; G06T 2207/30248; G06T 7/74
See application file for complete search history.

(56) References Cited

U.S. PATENT DOCUMENTS

| 2019/0222736 | A1* | 7/2019 | Wheeler | G05D 1/0248 |
|---|---|---|---|---|
| 2019/0384295 | A1 | 12/2019 | Shashua et al. | |
| 2020/0025931 | A1* | 1/2020 | Liang | G06K 9/627 |
| 2020/0150654 | A1* | 5/2020 | Isele | G06N 3/006 |
| 2021/0108926 | A1* | 4/2021 | Tran | G06N 3/04 |

FOREIGN PATENT DOCUMENTS

| CN | 104535070 | 4/2015 |
|---|---|---|
| CN | 104658039 | 5/2015 |
| TW | 201937399 | 9/2019 |
| TW | 202001786 | 1/2020 |
| TW | 202006395 | 2/2020 |
| WO | 2019079211 | 4/2019 |

* cited by examiner

*Primary Examiner* — Farzana Hossain
(74) *Attorney, Agent, or Firm* — JCIPRNET

(57) ABSTRACT

The disclosure provides a map construction method, and the map construction method includes: periodically detecting a base world coordinate of a mobile vehicle; periodically capturing a first image of surroundings outside the mobile vehicle; periodically obtaining LiDAR data of the surroundings outside the mobile vehicle; identifying a plurality of target objects in the first image and projecting a plurality of LiDAR data points onto the first image to obtain a second image according to the LiDAR data; identifying an image coordinate of each of a plurality of projected target LiDAR data points in a selected target object; obtaining an object world coordinate of each of the target LiDAR data points according to the image coordinates, LiDAR information, and the base world coordinate; and disposing the selected target object into a high definition map according to the object world coordinates.

10 Claims, 9 Drawing Sheets

MAP CONSTRUCTION SYSTEM AND MAP CONSTRUCTION METHOD

CROSS-REFERENCE TO RELATED APPLICATION

This application claims the priority benefit of Taiwan application serial no. 109106033, filed on Feb. 25, 2020. The entirety of the above-mentioned patent application is hereby incorporated by reference herein and made a part of this specification.

BACKGROUND

Technical Field

The disclosure relates to a map construction method, and particularly, to a map construction system configured on a mobile vehicle and a map construction method adapted for the map construction system.

Description of Related Art

In the field of automated driving, the term "map" has lost its conventional meaning of a route map. Currently, the resolution of most on-board maps is merely meant for the purpose of general navigation. To realize automated driving, a high definition map having a higher definition and more detailed road information must be provided. Generally, a conventional electronic map is mainly used by people to travel in their everyday life, and the definition of such a map is at a meter level. Thus, even with an error of ten-odd meters, there is no big effect on the user. In contrast, a high definition map has a definition up to a centimeter level for locations of traffic lane lines, shoulders, and the like.

SUMMARY

The disclosure provides a map construction system and a map construction method for the map construction system, which may identify a target object in a captured image and produce a world coordinate of the target object in order to dispose the target object in a high definition map according to the world coordinate of the target object.

An embodiment of the disclosure provides a map construction system disposed on a mobile vehicle, where the mobile vehicle moves in a real world. The map construction system includes a positioning system, an image capturing device, a LiDAR, and a processor. The positioning system is configured to periodically detect a world coordinate of the mobile vehicle. The image capturing device is configured to periodically capture a first image of surroundings outside the mobile vehicle. The LiDAR is configured to periodically obtain LiDAR data of the surroundings outside the mobile vehicle. The processor is electrically connected to the positioning system, the image capturing device, and the LiDAR. The processor is configured to identify a plurality of target objects in the first image, and project a plurality of LiDAR data points onto the first image to obtain a second image according to the LiDAR data. The processor is further configured to select one target object from the one or more target objects which have not been selected, identify a plurality of projected target LiDAR data points in the selected target object as a plurality of target object base points of the selected target object, and identify an image coordinate of each of the target object base points. In addition, the processor is further configured to obtain respective world coordinates of the target object base points according to the respective image coordinates of the target object base points, LiDAR information, and the world coordinate of the mobile vehicle, and dispose the corresponding selected target object into a high definition map according to the respective world coordinates of the target object base points.

An embodiment of the disclosure provides a map construction method, and the map construction method includes: periodically detecting a world coordinate of the mobile vehicle; periodically capturing a first image of surroundings outside the mobile vehicle; periodically obtaining LiDAR data of the surroundings outside the mobile vehicle; identifying a plurality of target objects in the first image, and projecting a plurality of LiDAR data points onto the first image to obtain a second image according to the LiDAR data; selecting one target object from the one or more target objects which have not been selected; identifying a plurality of projected target LiDAR data points in the selected target object as a plurality of target object base points of the selected target object, and identifying an image coordinate of each of the target object base points; obtaining respective world coordinates of the target object base points according to the respective image coordinates of the target object base points, LiDAR information, and the world coordinate of the mobile vehicle; and disposing the corresponding selected target object into a high definition map according to the respective world coordinates of the target object base points.

In an embodiment of the disclosure, the map construction method further includes: in response to determining that the one or more target objects which have not been selected are not present among the target objects, performing again the step of projecting the LiDAR data points onto the first image to obtain the second image according to the LiDAR data and identifying the target objects in the second image.

In an embodiment of the disclosure, the step of identifying the target objects in the first image includes: performing an image identification operation on the first image to identify the target objects which conform to a plurality of predetermined patterns from a plurality of image objects in the first image.

In an embodiment of the disclosure, the step of obtaining the respective world coordinates of the target object base points according to the respective image coordinates of the target object base points, the LiDAR information, and the world coordinate of the mobile vehicle includes: determining the selected target object to be a first type target object or a second type target object. In response to determining the selected target object to be the first type target object, the step further includes transforming, according to a plurality of preset parameters and a plurality of image coordinates of a plurality of first type target object base points of the first type target object, the image coordinates into a plurality of relative coordinates, where the relative coordinates are configured to represent locations of the first type target object base points with respect to the image capturing device; and transforming the relative coordinates of the first type target object base points into the world coordinates of the first type target object base points according to the world coordinate of the mobile vehicle and the relative coordinates of the first type target object base points. In addition, in response to determining the selected target object to be the second type target object, the step further includes transforming, according to a plurality of preset parameters, a plurality of image coordinates of a plurality of second type target object base points of the second type target object, and a plurality of pieces of depth information in the LiDAR information corresponding to the second type target object base points, the image coordinates into a plurality of relative coordinates, where the relative coordinates are configured to represent locations of the second type target object base points with respect to the image capturing device; and transforming the relative coordinates of the second type target object base points into the world coordinates of the second type target object base points according to the world coordinate of the mobile vehicle and the relative coordinates of the second type target object base points.

In an embodiment of the disclosure, the first type target object includes one of the following objects: a road, a traffic marking, and a ground traffic sign. In addition, the second type target object includes one of the following objects: a traffic signal, a signboard, and a building.

Based on the above, the map construction system and the map construction method provided by the embodiments of the disclosure may automatically project the LiDAR data points onto the captured first image to obtain the second image according to the obtained LiDAR data, identify the target object in the second image, and obtain the world coordinates of each of the base points according to the image coordinates of the base points of the target object, the LiDAR information, and the obtained world coordinate of the mobile vehicle, so as to dispose and precisely draw the corresponding target object into the high definition map according to the world coordinates of the base points, which makes the map construction system more efficient in constructing the high definition map.

The accompanying drawings are included to provide a further understanding of the disclosure and are incorporated in and constitute a part of this specification. The drawings illustrate embodiments of the disclosure and, together with the description, serve to explain the principles of the disclosure.

DESCRIPTION OF THE EMBODIMENTS

Figure 1:
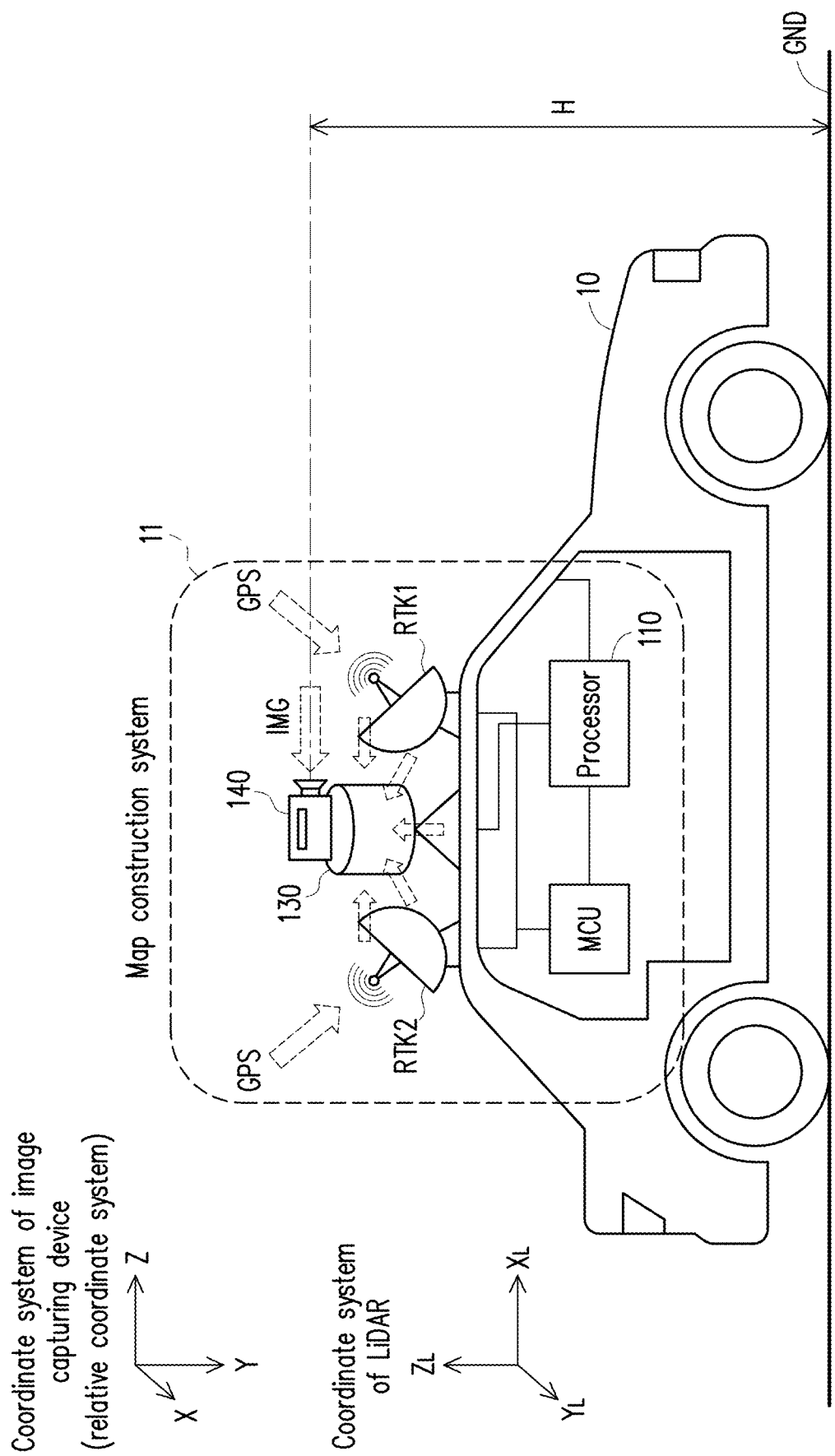
FIG. 1 is a schematic view of a map construction system disposed on a mobile vehicle according to an embodiment of the disclosure.

FIG. 1 is a schematic view of a map construction system disposed on a mobile vehicle according to an embodiment of the disclosure. Referring to FIG. 1, in the embodiment, the mobile vehicle 10 may be, for example, a car, a motorcycle, a drone, and other transportations moving in the real world.

The map construction system 11 is disposed on the mobile vehicle 10. In this embodiment, a LiDAR (i.e., light detection and ranging) 130 and an image capturing device 140 (for example, a camera) of the map construction system 11 are disposed on the mobile vehicle 10 to detect the surroundings outside the mobile vehicle 10. In addition, the LiDAR 130 and the image capturing device 140 are coupled (electronically connected) to RTK (Real Time Kinematic) antennas RTK1 and RTK2 of a positioning system 120. The positioning system 120 applies a real-time kinematic positioning technique. The RTK antennas RTK1 and RTK2 receive global positioning system (GPS) signals and transmit the received GPS signals to the positioning system 120 such that the positioning system 120 may calculate a world coordinate (including longitude/latitude coordinates and height coordinates) of the mobile vehicle 10/the map construction system 11. The image capturing device 140 is used for capturing an image (i.e., a first image) of the surroundings outside the mobile vehicle 10, and a height H between the mounted image capturing device 140 and a ground GND is preset/known.

Figure 4:
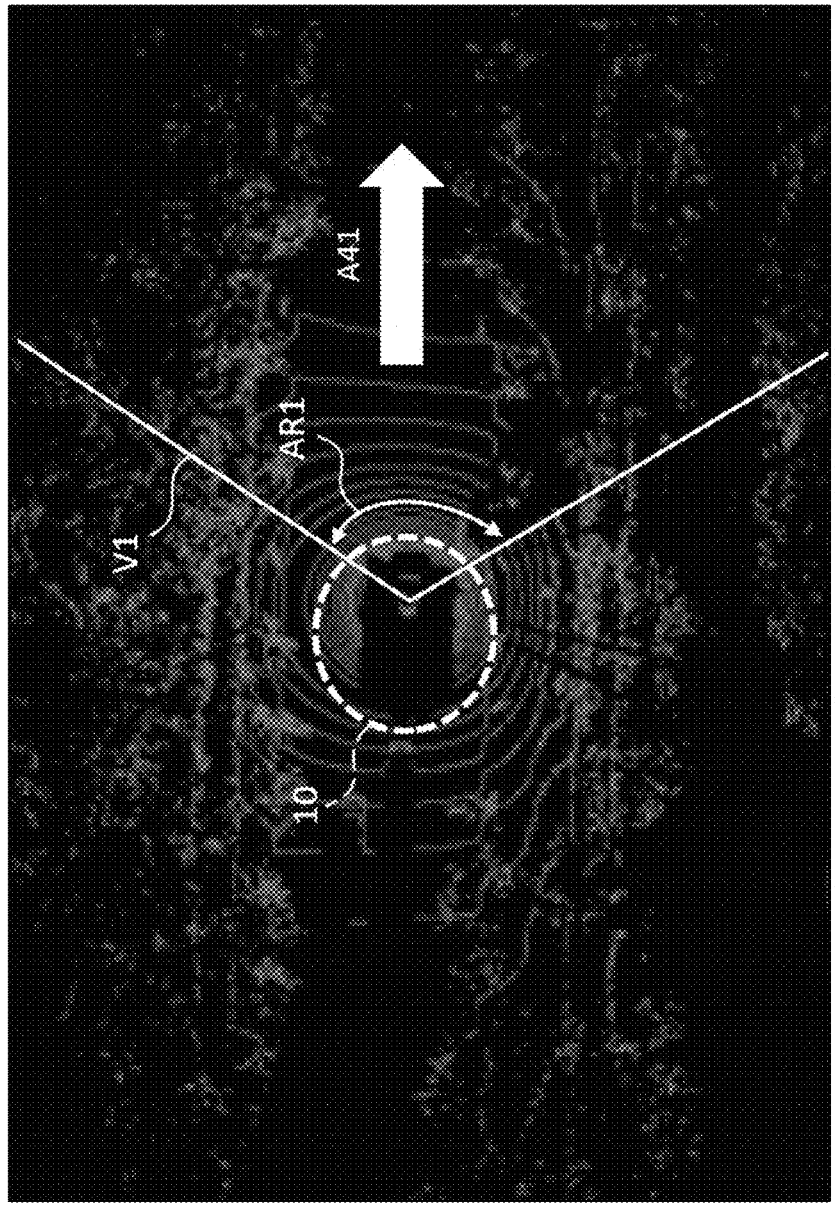
FIG. 4 is a schematic view of a LiDAR point cloud diagram according to an embodiment of the disclosure.

FIG. 4 is a schematic view of a LiDAR point cloud diagram according to an embodiment of the disclosure. Referring to FIG. 1 and FIG. 4 at the same time, in the embodiment of FIG. 1, during a process of forward movement of the car 10 (as indicated by arrow A41), the image capturing device 140 continues to capture images of the surroundings outside the car 10 (for example, taking photos of a view in front of the car 10); the LiDAR 130 continues to emit a laser in order to obtain a 3D coordinate (i.e., a 3D LiDAR coordinate) of a reflection point (i.e., a LiDAR data point) with respect to the LiDAR 130 through the reflection light, and thereby further obtain the point cloud diagram which includes all the LiDAR data points (as shown in FIG. 4). It is noted that the LiDAR point cloud diagram in FIG. 4 is shown as viewed from a top viewing angle. The LiDAR 130, for example, performs a 360 degree pulsed laser scan on the surroundings at a frequency of 10 Hz. The disclosure does not specifically limit the technical details of the LiDAR 130, such as the laser intensity, laser wavelength, laser amount, emission angle, emission frequency, and the like. In addition, it is noted that other technical features of the LiDAR 130 do not belong to the concept of the disclosure and descriptions thereof are not elaborated herein.

For ease of illustration, in embodiments below, the mobile vehicle 10 is a car as an example.

Figure 2:
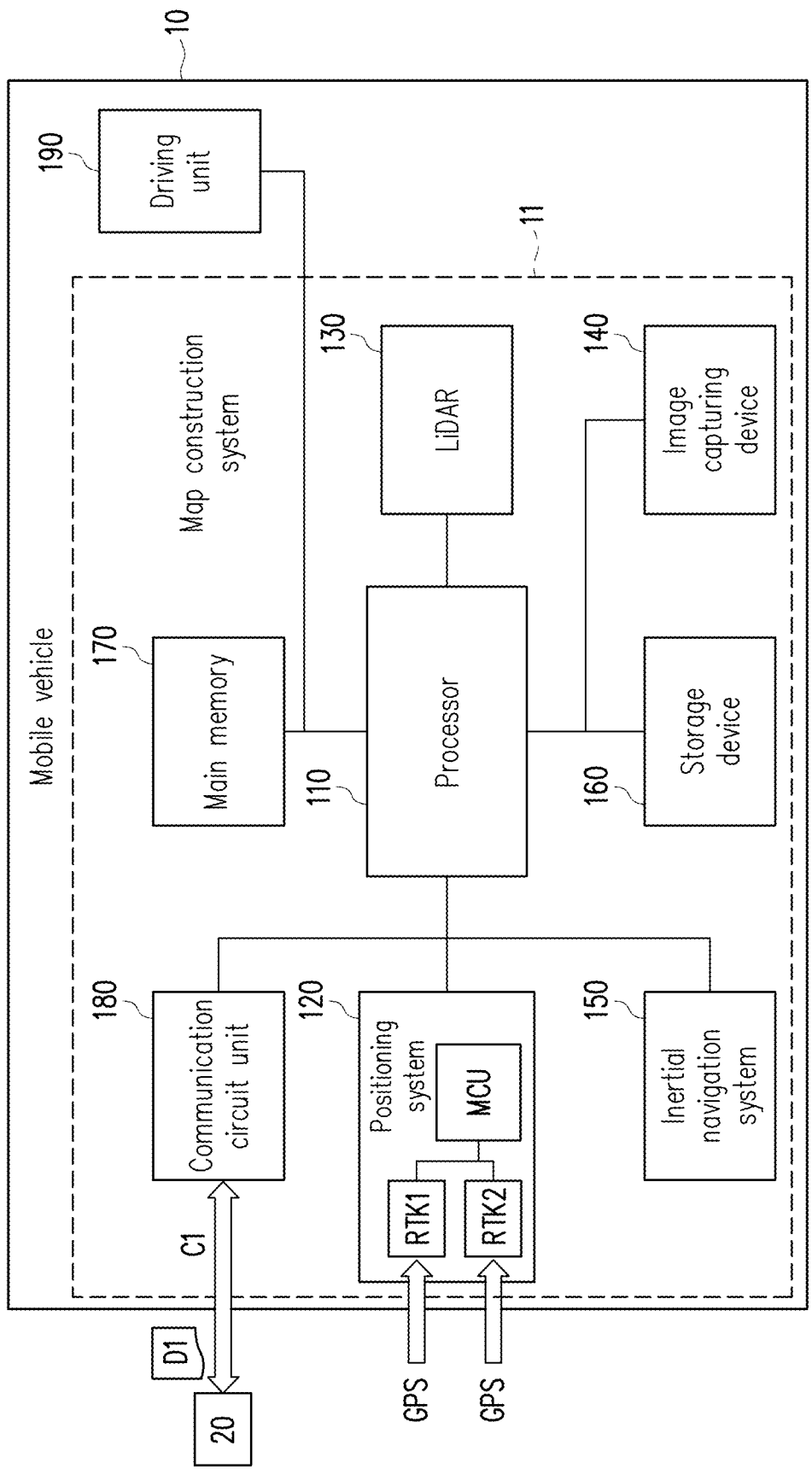
FIG. 2 is a block diagram of a map construction system according to an embodiment of the disclosure.

FIG. 2 is a block diagram of a map construction system according to an embodiment of the disclosure. Referring to FIG. 2, specifically, the map construction system 11 disposed on the car 10 includes a processor 110, a positioning system 120, a LiDAR 130, an image capturing device 140, an inertial navigation system 150, a storage device 160, a main memory 170, and a communication circuit unit 180 which are coupled (electronically connected) to the processor 110. In addition, the processor 110 is further coupled to a driving unit 190 of the mobile vehicle 10.

The processor 110 is hardware having computation capability (for example, a chipset, a processor, and the like) and is configured to manage the overall operation of the car 10 (for example, controlling operations of other hardware elements in the car 10). In the embodiment, the processor 110 is, for example, a single-core or a multi-core central processing unit (CPU), a micro-processor, or other programmable processing unit, digital signal processor (DSP), programmable controller, application specific integrated circuit (ASIC), programmable logic device (PLD), or other similar apparatuses.

The positioning system 120 includes a microcontroller MCU and antennas RTK1 and RTK2. The antennas RTK1 and RTK2 are used for receiving a signal from the global positioning system (a GPS signal) and transmitting the received GPS signal to the microcontroller MCU. The microcontroller MCU is configured to calculate a current world coordinate (i.e., a base world coordinate) of the car 10 according to the received GPS signal.

The LiDAR 130 is used for obtaining light detection and ranging data (i.e., LiDAR data) of the surroundings outside the car 10.

The image capturing device 140 is used for capturing images of the surroundings outside the car 10. The image capturing device 140 is, for example, a camera or a video camera. In the embodiment, the image capturing device periodically captures (for example, a shot is taken every one-sixtieth of a second) images of the real world in front of the car 10. The resolution and size/range of the captured image (i.e., a first image) are preset according to a hardware specification of the camera, and the disclosure is not limited thereto.

The inertial navigation system 150 is an auxiliary navigation system using an accelerometer and a gyroscope to measure acceleration and angular velocity of an object (for example, the car 10) and continue to calculate locations, postures, and speed of the object in movement. The inertial navigation system 150 does not need an external reference frame. In the embodiment, the positioning system 120 (or the processor 110) may provide initial positioning information and speed of the car 10 to the inertial navigation system in order for the inertial navigation system to perform integrated computation on information of the motion sensors (for example, the accelerometer and the gyroscope) to continuously update a current location and speed. The updated current location and speed may be integrated as auxiliary positioning information to be transmitted back to the positioning system 120. The microcontroller MCU of the positioning system 120 may calibrate the current positioning information by the received auxiliary positioning information to improve the accuracy of the positioning information transmitted to the processor 110. In addition, the calibrated positioning information may also be sent back to the inertial navigation system 150 to correct the errors resulting from continuous computation of the auxiliary positioning information of the inertial navigation system 150, thereby improving the accuracy of the auxiliary positioning information. In other words, after integrating the positioning system 120 and the inertial navigation system 150, the processor 110 may precisely obtain the current world coordinate of the car 10.

The storage device 160 stores data temporarily according to an instruction of the processor 110. The data include system data for managing the car 10, such as the obtained positioning information, the LiDAR data, inertial information, image data, and data coming from other electronic devices, and the disclosure is not limited thereto. In addition, the storage device 160 may also record some data which require to be stored for a long period according to an instruction of the processor 110. Such data include, for example, a high definition map database, a predetermined pattern image database, one or more preset parameters relevant to a map construction procedure executed by the map construction system 11, the LiDAR point cloud diagram, and hardware or software for managing the car 10.

The storage device 160 may be a hard disk drive (HDD) of any forms or a non-volatile memory storage device (for example, a solid state disk). In an embodiment, the storage device 160 may also be, for example, hardware including a flash memory module. In an embodiment, the processor 110 may access the map construction procedure in the main memory 170 and execute the map construction procedure to realize the map construction method provided in the embodiments of the disclosure.

The main memory 170 is respectively used for receiving instructions of the processor 110 to temporarily store all forms of data. The main memory 170 is, for example, any forms of a fixed or mobile random access memory (RAM) or other similar apparatuses, integrated circuits, and a combination thereof. Since the main memory 170 has a high speed access characteristic, calculations and operations performed in the embodiment may all be accelerated by accessing relevant data stored temporarily in the main memory 170.

The communication circuit unit 180 receives a communication signal in a wireless manner. In the embodiment, the communication circuit unit 180 is a wireless communication circuit unit which supports, for example, the WiFi communication protocol, Bluetooth, Near Field Communication (NFC), 3rd Generation Partnership Project (3GPP) standards, 4th Generation Partnership Project (4GPP) standards, 5th Generation Partnership Project (5GPP) standards, etc. In the embodiment, the communication circuit unit 180 may be connected to a positioning reference device 20 by wireless communication (for example, by a connection C1), and thereby obtain a positioning reference data D1 from the positioning reference device 20.

It is noted that, in an embodiment, the positioning system 120 applies a Real Time Kinematic (RTK) technique to calculate the world coordinate (i.e., the base world coordinate) of the car 10 according to the received positioning reference data D1 and the received GPS signal, and thereby improve the accuracy of the obtained base world coordinate.

In addition, in an embodiment, the constructed high definition map may also be transmitted to a map server (not shown) by wireless communication for the map server to integrate and share a high definition world map updated in real time. That is to say, the map server may integrate real-time high definition maps received from multiple cars into the high definition world map managed by the map server, and the high definition world map may be shared to other electronic devices by network connection.

The driving unit 190 is used for controlling movement of the car 10. In an embodiment, the driving unit 190 is used for controlling movement of the car 10 according to an instruction of the processor 110. Specifically, the driving unit 190 may control the movement direction, speed, and acceleration of the car 10 by controlling the mechanical system and the power system of the car 10. The disclosure does not specifically limit the implementation of the driving unit 190, and details of the driving unit 190 are not elaborated herein.

Figure 3A:
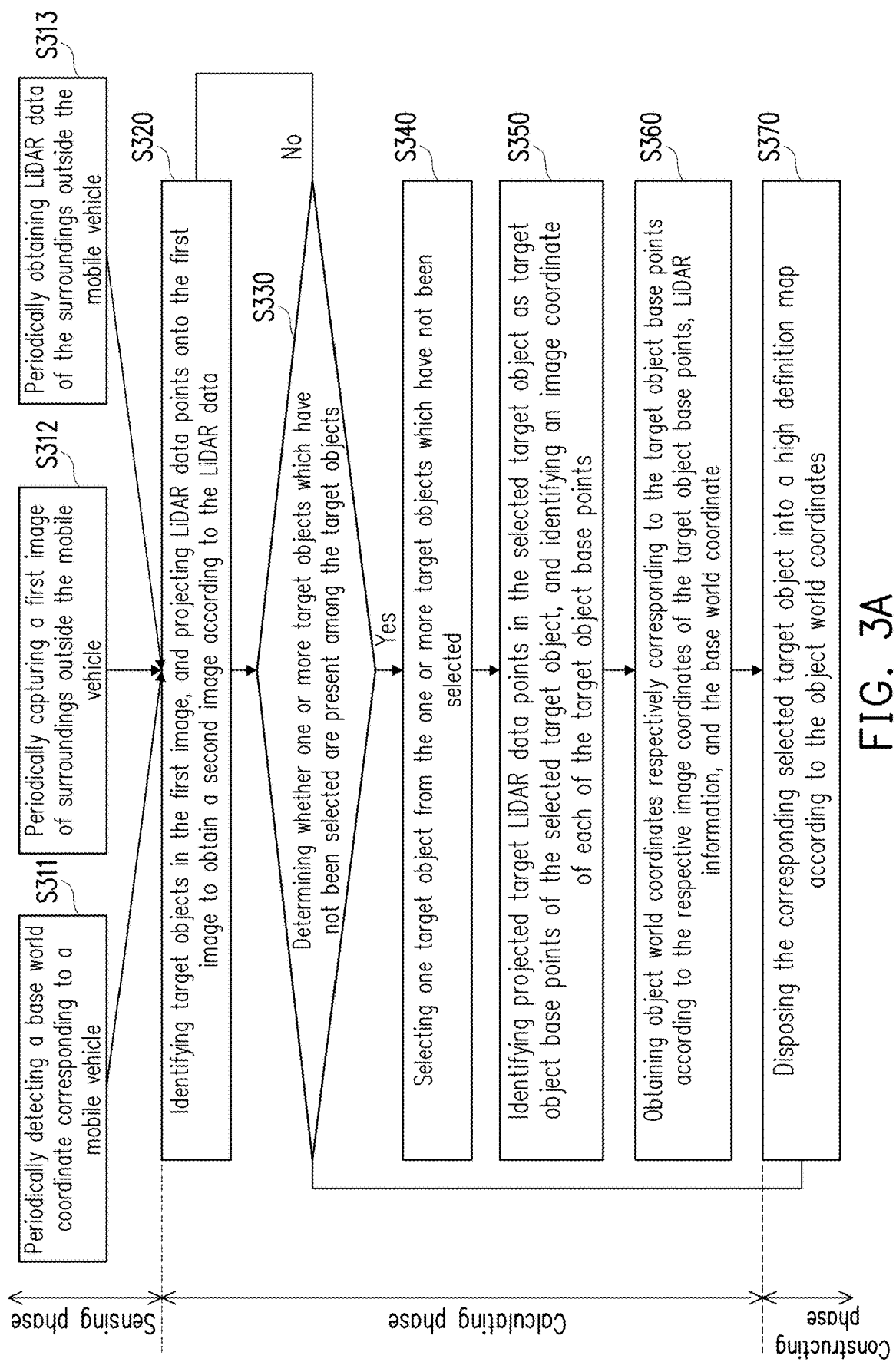
FIG. 3A is a flowchart of a map construction method according to an embodiment of the disclosure.

FIG. 3A is a flowchart of a map construction method according to an embodiment of the disclosure. Referring to FIG. 3A, in step S311, the positioning system 120 periodically detects a base world coordinate corresponding to the mobile vehicle (for example, the positioning information corresponding to the car 10). In step S312, the image capturing device 140 periodically captures a first image of surroundings outside the mobile vehicle. In step S313, the LiDAR 130 periodically obtains LiDAR data of the surroundings outside the mobile vehicle. The base world coordinate, the first image, and the LiDAR data are transmitted to the processor 110.

Then, in step S320, the processor 110 projects a plurality of LiDAR data points onto the first image to obtain a second image according to the LiDAR data, and identifies a plurality of target objects in the second image.

FIG. 4 is a schematic view of a LiDAR point cloud diagram according to an embodiment of the disclosure. Specifically, as shown in FIG. 4, the location of a reflection point may be obtained by emitting a laser 360 degrees around the car 10 at a high frequency to form the LiDAR data in a form of the point cloud diagram. When the car 10 moves forward as indicated by arrow A41, the LiDAR point cloud diagram is also updated correspondingly. Each of a plurality of bright points (i.e., the LiDAR data points or the reflection points) in the LiDAR point cloud diagram includes 3D coordinate information of itself (i.e., the 3D LiDAR coordinate). The 3D coordinate information of a LiDAR data point records the 3D coordinate of the LiDAR data point with respect to the car 10.

Specifically, during an operation of projecting the LiDAR data points onto the first image to obtain the second image according to the LiDAR data, according to an angle range of the first image with respect to the image capturing device (for example, the corresponding angle range AR1 can be told from a view V1 of the first image captured by the image capturing device 140) and a plurality of 3D LiDAR coordinates corresponding to the angle range in the LiDAR data points, the processor 110 performs a coordinate transformation operation on the 3D LiDAR coordinates to obtain a plurality of 2D LiDAR coordinates corresponding to the 3D LiDAR coordinates. Specifically, the processor projects the corresponding LiDAR data points onto the first image to form the second image according to the 2D LiDAR coordinates.

Figure 5A:
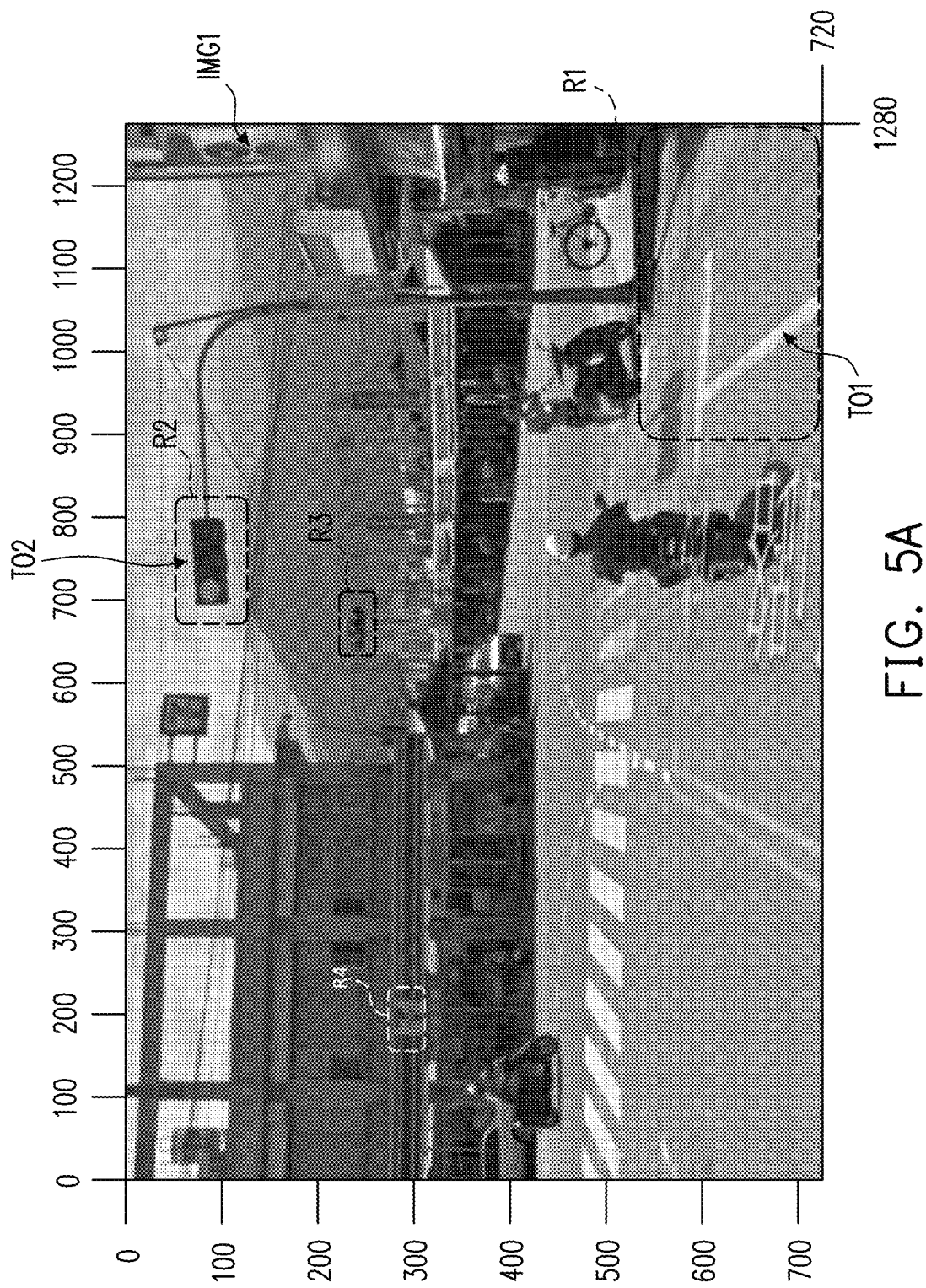
FIG. 5A is a schematic view of a captured first image according to an embodiment of the disclosure.
Figure 5B:
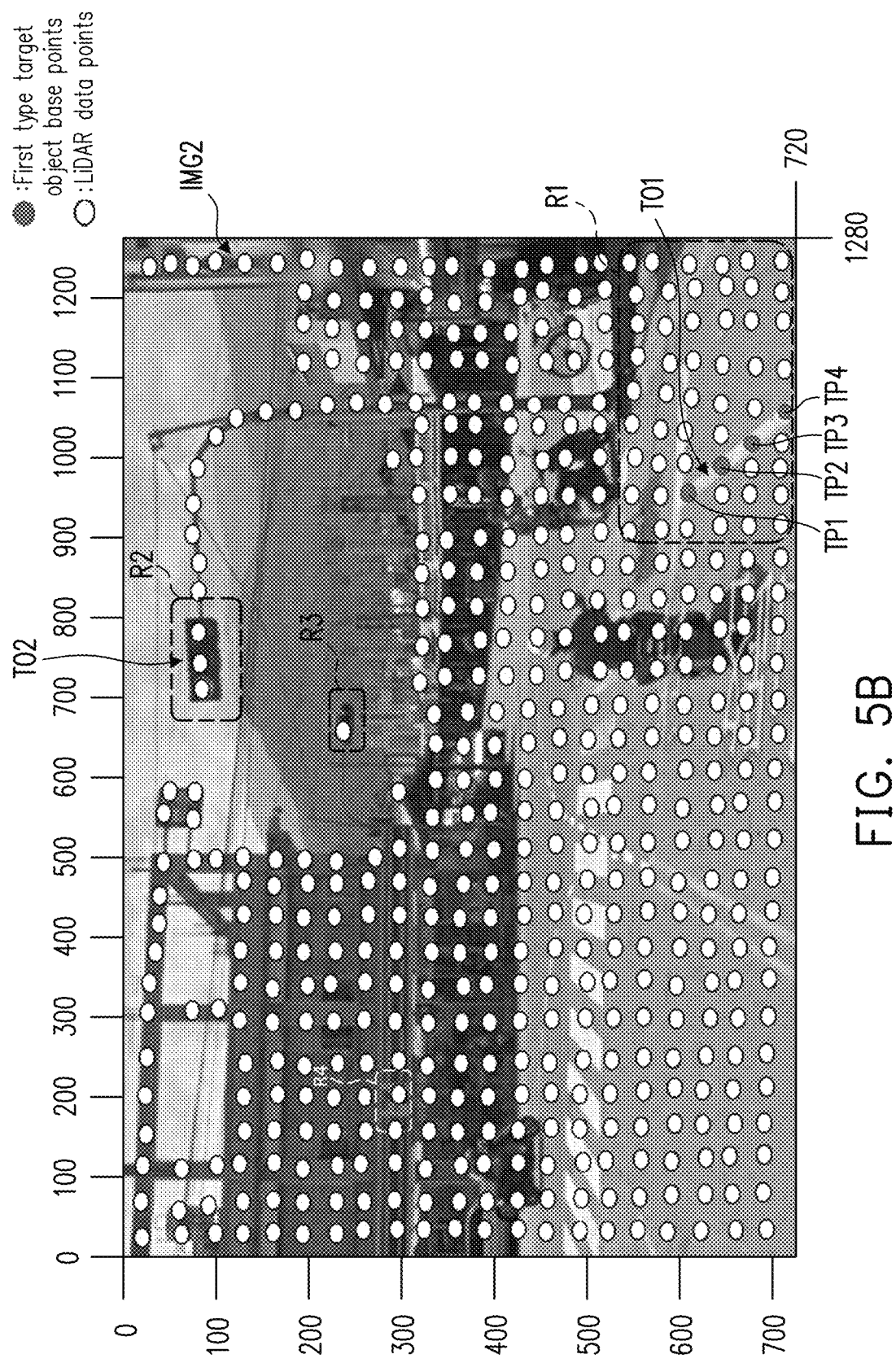
FIG. 5B is a schematic view of a second image including projected LiDAR data points according to an embodiment of the disclosure.

FIG. 5A is a schematic view of a captured first image according to an embodiment of the disclosure. FIG. 5B is a schematic view of a second image including projected LiDAR data points according to an embodiment of the disclosure. For example, referring to FIG. 5A, it is assumed that a resolution of a first image IMG1 captured by the image capturing device 140 is 1280×720. In the embodiment, the processor 110 performs an image identification operation on the first image to identify the target objects which conform to a plurality of predetermined patterns from a plurality of image objects in the first image IMG1. Specifically, the processor 110 may identify the predetermined patterns from the predetermined pattern image database in the storage device 160, and compare the image objects in the first image IMG1 with the predetermined pattern images recorded in the predetermined pattern image database to identify the target objects (i.e., target image objects) having a similarity greater than a comparison threshold value. For example, the processor 110 may identify a target object TO1 (road marking) in a region R1 of the first image IMG1 and a target object TO2 (traffic signal) in a region R2.

More specifically, in the embodiment, the target object may be categorized into a first type target object and a second type target object. In the embodiment, the first type target object represents an object having a height equal to the road when disposed in the high definition map, and the second type target object represents an object having a height not equal to the road when disposed in the high definition map.

The first type target object includes one of the following objects: a road, a traffic marking, and a ground traffic sign. The second type target object includes one of the following objects: a traffic signal, a signboard, and a building. In an embodiment, the processor 110 also identifies a target object (for example, a traffic signal) in a region R3 and a target object (for example, a signboard) in a region R4. It is worth mentioning that the predetermined patterns mentioned above include a plurality of preset images of the road, the traffic marking, the ground traffic sign, the traffic signal, the signboard, and the building.

Referring to FIG. 5B, in the embodiment, the processor 110 may perform coordinate transformation on the obtained LiDAR data points corresponding to the view (angle range) of the first image to transform the 3D LiDAR coordinates of the LiDAR data points into the 2D LiDAR coordinate (the 2D LiDAR coordinate does not have depth information, that is, a depth value from the LiDAR data point to the car). Then, the processor 110 may project the LiDAR data points into the first image IMG1 according to the 2D LiDAR coordinates corresponding to the LiDAR data points to obtain the second image IMG2 having the projected LiDAR data points.

Referring to FIG. 3A again, then, in step S330, the processor 110 determines whether one or more target objects which have not been selected are present among the target objects. In response to determining that the one or more target objects which have not been selected are present among the target objects, the processor 110 performs step S340, that is, to select one target object from the one or more target objects which have not been selected; in response to determining that the one or more target objects which have not been selected are present among the target objects, the processor 110 performs step S320.

In step S340, the processor 110 selects one target object from the one or more target objects which have not been selected. Then, in step S350, the processor 110 identifies a plurality of projected target LiDAR data points in the selected target object as a plurality of target object base points of the selected target object, and identifies the image coordinate of each of the target object base points.

For example, as shown in FIG. 5B, assuming that one or more target LiDAR data points (for example, points TP1 to TP4) are projected onto the selected target object TO1, the processor 110 identifies the LiDAR data points TP1 to TP4 as the target object base points. The processor 110 may further identify the image coordinates of the target object base points TP1 to TP4 in the first image (based on the resolution of the first image). For example, the image coordinate of the target object base point TP1 is identified as "910, 610".

Referring to FIG. 3A again, in step S360, the processor 110 obtains a plurality of object world coordinates respectively corresponding to the target object base points according to the respective image coordinates of the target object base points, the LiDAR information, and the base world coordinate.

Figure 3B:
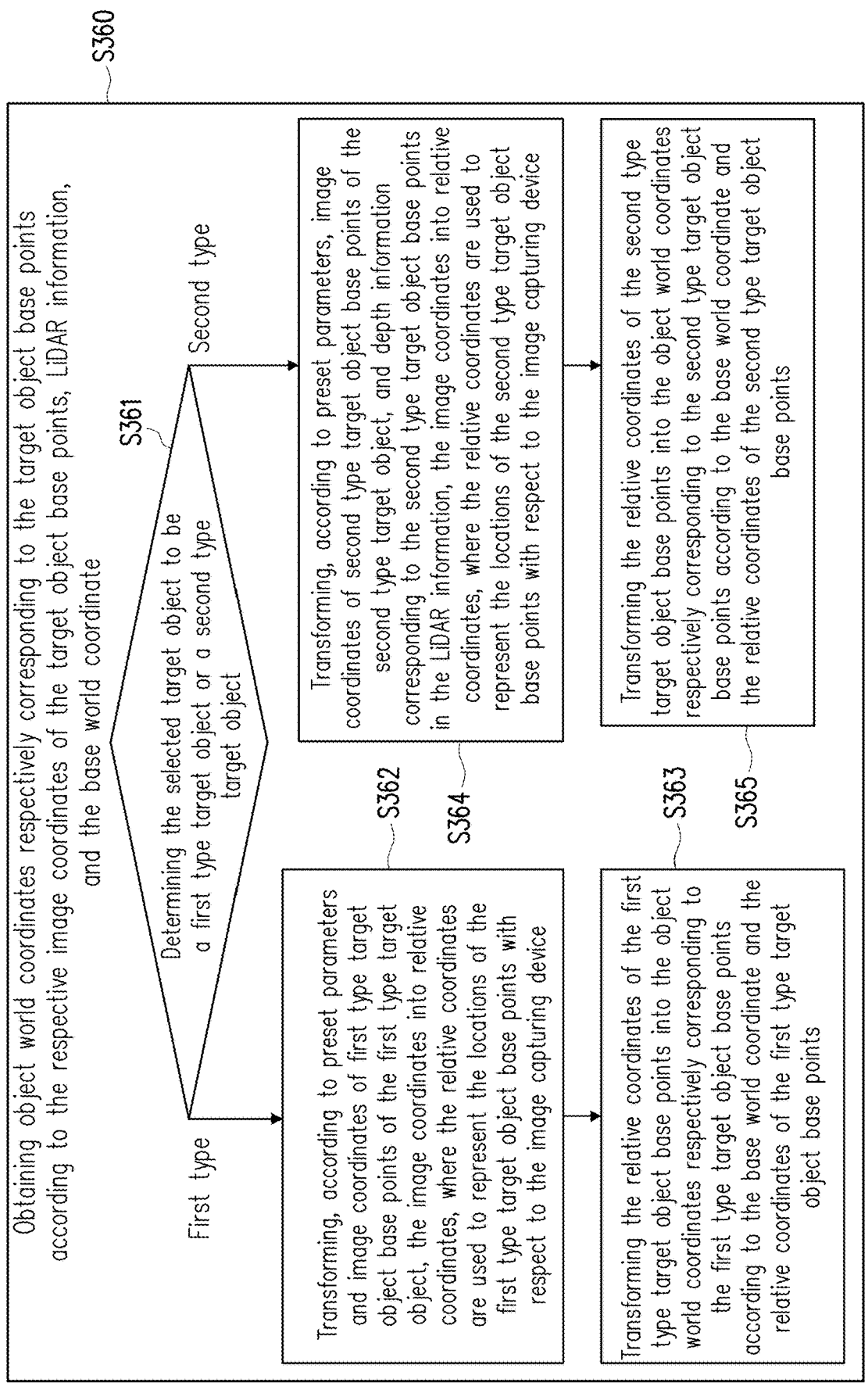
FIG. 3B is a flowchart of step S360 in FIG. 3A according to an embodiment of the disclosure.
Figure 6A:
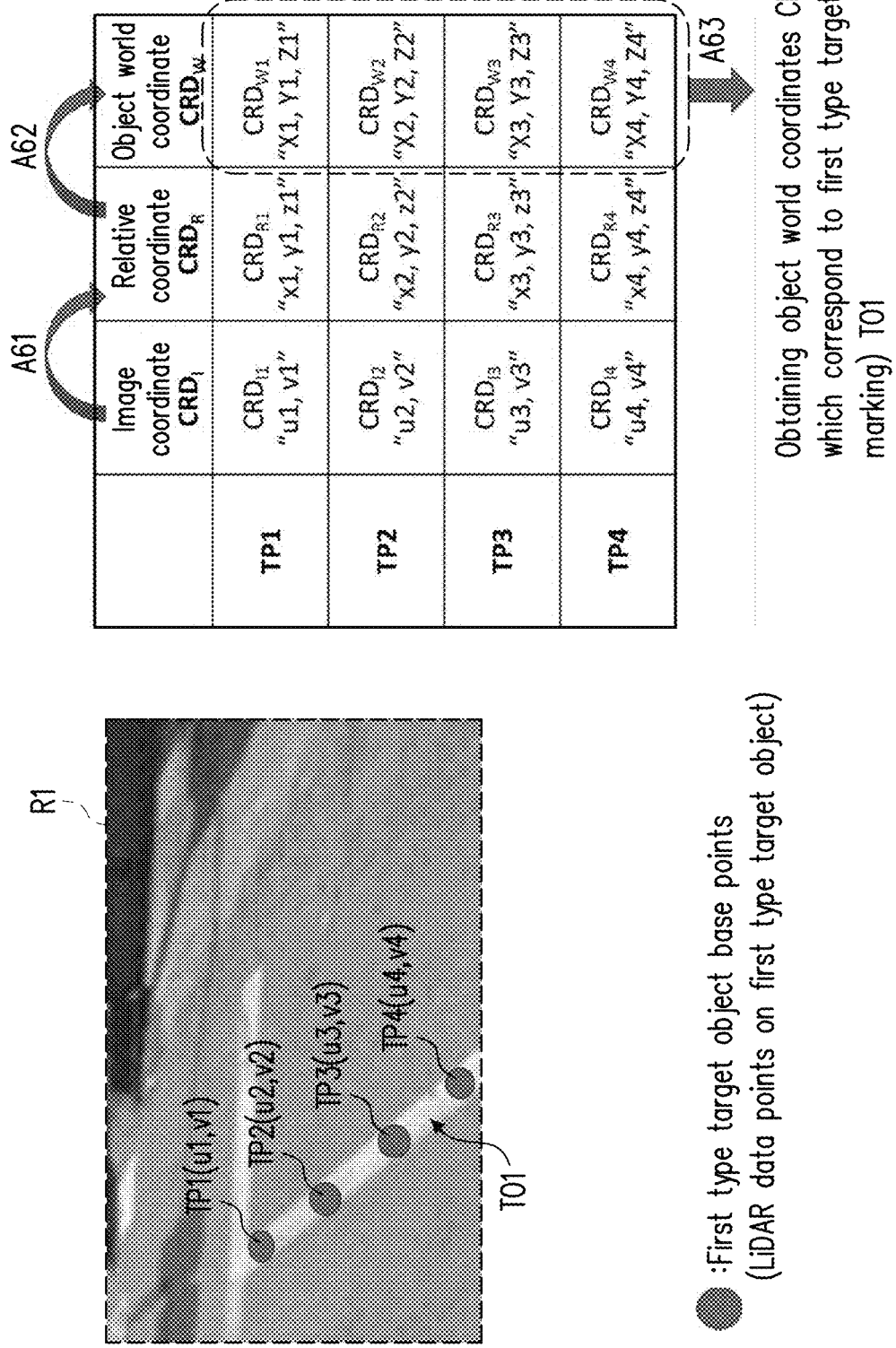
FIG. 6A is a schematic view of obtained world coordinates of a first type target object according to an embodiment of the disclosure.

FIG. 3B is a flowchart of step S360 in FIG. 3A according to an embodiment of the disclosure. More specifically, step S360 includes steps S361 to S365. In step S361, the processor 110 determines the selected target object to be a first type target object or a second type target object. In response to determining the selected target object to be the first type target object (the first type target object TO1 as shown in FIG. 6A), in step S362, according to a plurality of preset parameters and a plurality of image coordinates of a plurality of first type target object base points of the first type target object, the processor 110 transforms the image coordinates into a plurality of relative coordinates, where the relative coordinates are used to represent the locations of the first type target object base points with respect to the image capturing device of the map construction system. In step S363, the processor 110 transforms the relative coordinates of the first type target object base points into the object world coordinates respectively corresponding to the first type target object base points according to the base world coordinate and the relative coordinates of the first type target object base points.

Figure 6B:
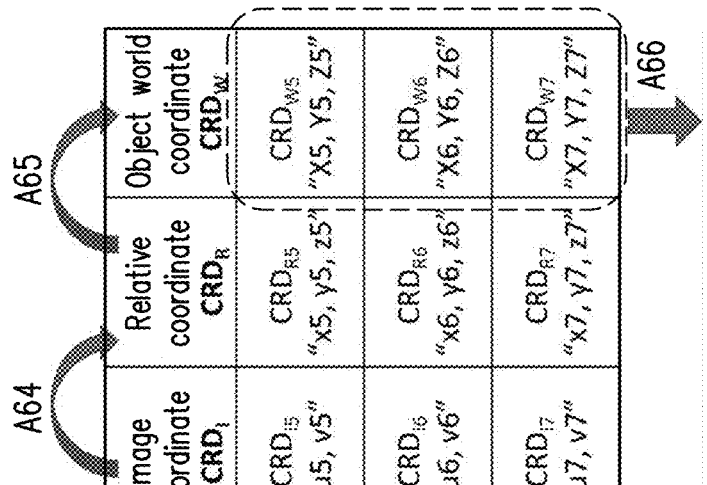
FIG. 6B is a schematic view of obtained world coordinates of a second type target object according to an embodiment of the disclosure.
Figure 6B:
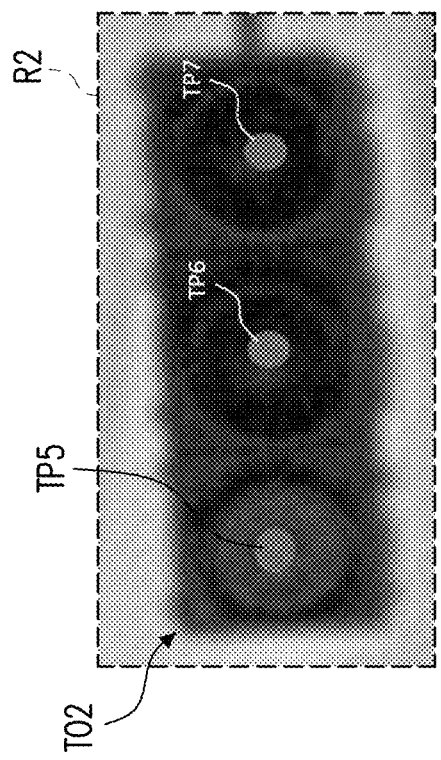

Alternatively, in response to determining the one selected target object to be the second type target object (the second type target object TO2 as shown in FIG. 6B), in step S364, according to a plurality of preset parameters, a plurality of image coordinates of a plurality of second type target object base points of the second type target object, and a plurality of pieces of depth information corresponding to the second type target object base points in the LiDAR information, the processor 110 transforms the image coordinates into a plurality of relative coordinates, where the relative coordinates are used to represent the locations of the second type target object base points with respect to the image capturing device of the map construction system. In step S365, the processor 110 transforms the relative coordinates of the second type target object base points into the object world coordinates respectively corresponding to the second type target object base points according to the base world coordinate and the relative coordinates of the second type target object base points.

FIG. 6A is a schematic view of obtained world coordinates of the first type target object according to an embodiment of the disclosure. Referring to FIG. 6A, it is assumed that the processor 110 has identified the selected target object TO1 as a first type target object, and has identified respective image coordinates $CRD_I$ of the first type target object base points TP1 to TP4 on the first type target object TO1 to be $CRD_{I1}$ "u1, v1", $CRD_{I2}$ "u2, v2", $CRD_{I3}$ "u3, v3", and $CRD_{I4}$ "u4, v4". In this embodiment, the processor 110 transforms the image coordinates $CRD_{I1}$ to $CRD_{I4}$ into a plurality of relative coordinates $CRD_{R1}$ to $CRD_{R4}$ via the coordinate transformation formula (F1) listed below according to a plurality of preset parameters and the image coordinates $CRD_{I1}$ to $CRD_{I4}$ of the first type target object base points TP1 to TP4.

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} \frac{x}{z} \\ \frac{y}{z} \\ 1 \end{bmatrix} \quad (F1)$$

where u is an abscissa of the image coordinate $CRD_I$ of the first type target object base points; v is an ordinate of the image coordinate $CRD_I$ of the first type target object base points; $f_x$ is an x-axis focal length; $f_y$ is a y-axis focal length; $c_x$ is an x-axis coordinate of a center of the first image; $c_y$ is a y-axis coordinate of the center of the first image; x is an x-axis coordinate of the relative coordinate $CRD_R$; y is a y-axis coordinate of the relative coordinate $CRD_R$; and z is a z-axis coordinate of the relative coordinate $CRD_R$. The preset parameters are $f_x$, $f_y$, $c_x$, and $c_y$. In this embodiment, the y-axis coordinate of the first type target object base points is known; that is, the value of y is the height H between the camera and the ground. In addition, the preset parameters $f_x$, $f_y$, $c_x$, and $c_y$ are also known. Based on this, the processor 110 may calculate the z-axis coordinate z of the relative coordinate $CRD_R$ to be the following via the coordinate transformation formula (F1):

$$z = \frac{f_y \times y}{(v - c_y)} \quad (F1.1)$$

Then, the x-axis coordinate x of the relative coordinate $CRD_R$ may be further calculated to be:

$$x = \frac{(u - c_x) \times f_y}{(v - c_y) \times f_x} y \quad (F1.2)$$

That is to say, the processor 110 may calculate the relative coordinate $CRD_R$(x, y, z) to be $$"\left( \frac{(u - c_x) \times f_y}{(v - c_y) \times f_x} y, H, \frac{f_y \times y}{(v - c_y)} \right)"$$

via the image coordinate $CRD_I$(u, v), the preset parameters $f_x$, $f_y$, $c_x$, and $c_y$, and the height H.

After calculating the relative coordinates $CRD_{R1}$ to $CRD_{R4}$ respectively corresponding to the first type target object base points TP1 to TP4 as indicated by arrow A61, the processor 110 may calculate object world coordinates $CRD_{W1}$ to $CRD_{W4}$ of the first type target object base points TP1 to TP4 via the base world coordinate and the relative coordinates $CRD_{R1}$ to $CRD_{R4}$ of the first type target object base points TP1 to TP4 as indicated by arrow A62. For example, the processor 110 may add the base world coordinate to the relative coordinate $CRD_{R1}$ of the first type target object base point TP1 to obtain the object world coordinate $CRD_{W1}$ of the first type target object base point TP1.

FIG. 6B is a schematic view of obtained world coordinates of the second type target object according to an embodiment of the disclosure. Referring to FIG. 6B, it is assumed that the processor 110 has identified the selected target object TO2 as a second type target object, and has identified respective image coordinates $CRD_I$ of the second type target object base points TP5 to TP7 on the second type target object TO2 to be $CRD_{I5}$ "u5, v5", $CRD_{I6}$ "u6, v6", and $CRD_{I7}$ "u7, v7". In this embodiment, the processor 110 transforms the image coordinates $CRD_{I5}$ to $CRD_{I7}$ into a plurality of relative coordinates $CRD_{R5}$ to $CRD_{R7}$ via the coordinate transformation formula (F1) listed above according to a plurality of preset parameters, the image coordinates $CRD_{I5}$ to $CRD_{I7}$ of the second type target object base points TP5 to TP7 of the second type target object, and a plurality of pieces of depth information in the LiDAR information corresponding to the second type target object base points (i.e., a known depth coordinate value in the 3D LiDAR coordinate of each of the second type target object base points TP5 to TP7, which may be used as the z-axis coordinate in the relative coordinate of each of the second type target object base points TP5 to TP7).

In this embodiment, the z-axis coordinate of the second type target object base points is known; that is, the value of z is a depth coordinate value in the 3D LiDAR coordinate (for example, "$x_L$" in the 3D LiDAR coordinate value "$(y_L, -z_L, x_L)$" corresponding to the relative coordinate "x, y, z"). In addition, the preset parameters $f_x$, $f_y$, $c_x$, and $c_y$ are also known. Based on this, the processor 110 may calculate the x-axis coordinate x of the relative coordinate $CRD_R$ to be the following via the coordinate transformation formula (F1):

$$x = \frac{(u - c_x) \times z}{f_x} \quad (F1.3)$$

Then, the y-axis coordinate y of the relative coordinate $CRD_R$ may be further calculated to be:

$$y = \frac{(v - c_{xy}) \times z}{f_y} y \quad (F1.4)$$

That is to say, the processor 110 may calculate the relative coordinate $CRD_R(x, y, z)$ to be $$\text{``}\left(\frac{(u - c_x) \times z}{f_x}, \frac{(v - c_{xy}) \times z}{f_y} y, z\right)\text{''}$$

via the image coordinate $CRD_I(u, v)$, the preset parameters $f_x$, $f_y$, $c_x$, and $c_y$, and the depth information z.

After calculating the relative coordinates $CRD_{R5}$ to $CRD_{R7}$ respectively corresponding to the second type target object base points TP5 to TP7 as indicated by arrow A64, the processor 110 may calculate object world coordinates $CRD_{W5}$ to $CRD_{W7}$ of the second type target object base points TP5 to TP7 via the base world coordinate and the relative coordinates $CRD_{R5}$ to $CRD_{R7}$ of the second type target object base points TP5 to TP7 as indicated by arrow A65. For example, the processor 110 may add the base world coordinate to the relative coordinate $CRD_{R5}$ of the second type target object base point TP5 to obtain the object world coordinate $CRD_{W5}$ of the second type target object base point TP5.

Referring to FIG. 3A again, in step S370, the processor 110 disposes the corresponding selected target object into the high definition map according to the object world coordinates.

Specifically, the processor 110 obtains the object world coordinates $CRD_{W1}$ to $CRD_{W4}$ of the first type target object TO1 as indicated by arrow A63, and then, the processor may dispose/draw the first type target object TO1 into the high definition map according to the object world coordinates $CRD_{W1}$ to $CRD_{W4}$. For another example, the processor 110 obtains the object world coordinates $CRD_{W5}$ to $CRD_{W7}$ of the second type target object TO2 as indicated by arrow A66, and then the processor may dispose/draw the second type target object TO2 into the high definition map according to the object world coordinates $CRD_{W5}$ to $CRD_{W7}$. A facing direction of a main layout of the second type target object TO2 in the high definition map may be further identified according to a captured image of the second type target object TO2.

Accordingly, via the map construction method and system described above, during the period when the mobile vehicle 10 moves in the real world, the map construction system 11 may automatically dispose the identified target objects into the high definition map according to the corresponding object world coordinates. Manpower consumed in constructing a high definition map in a conventional way is reduced, thereby increasing efficiency in constructing a high definition map.

In summary of the above, the map construction system and the map construction method provided by the embodiments of the disclosure may automatically project the LiDAR data points onto the captured first image to obtain the second image according to the obtained LiDAR data, identify the target object in the second image, and obtain the world coordinate of each of the base points according to the image coordinates of base points of the target object, the LiDAR information, and the obtained world coordinate of the mobile vehicle, so as to dispose and precisely draw the corresponding target object into the high definition map according to the world coordinates of the base points, which makes the map construction system more efficient in constructing the high definition map.

Although the disclosure has been disclosed by the above embodiments, it will be apparent to one of ordinary skill in the art that modifications to the described embodiments may be made without departing from the spirit of the scope or spirit of the disclosure. In view of the foregoing, the scope of the disclosure will be defined by the attached claims and their equivalents and not by the above detailed descriptions.

What is claimed is:

1. A map construction system, configured on a mobile vehicle, wherein the mobile vehicle moves in a real world, the map construction system comprising:
   a positioning system, configured to periodically detect a base world coordinate corresponding to the mobile vehicle;
   an image capturing device, configured to periodically capture a first image of surroundings outside the mobile vehicle;
   a LiDAR, configured to periodically obtain LiDAR data of the surroundings outside the mobile vehicle; and
   a processor, electrically connected to the positioning system, the image capturing device, and the LiDAR,
   wherein the processor is configured to identify a plurality of target objects in the first image, and project a plurality of LiDAR data points onto the first image to obtain a second image according to the LiDAR data,
   wherein the processor is further configured to select one target object from the one or more target objects which have not been selected,
   wherein the processor is further configured to identify a plurality of projected target LiDAR data points in the selected target object as a plurality of target object base points of the selected target object, and identify an image coordinate of each of the target object base points,
   wherein the processor is further configured to obtain a plurality of object world coordinates respectively corresponding to the target object base points according to the respective image coordinates of the target object base points, LiDAR information, and the base world coordinate,
   wherein the processor is further configured to dispose the corresponding selected target object into a high definition map according to the object world coordinates.

2. The map construction system according to claim 1, wherein the LiDAR data comprise the LiDAR information corresponding to the LiDAR data points, wherein in the operation of projecting the LiDAR data points onto the first image to obtain the second image according to the LiDAR data, the processor performs a coordinate transformation operation on a plurality of 3D LiDAR coordinates according to an angle range of the first image with respect to the image capturing device and the 3D LiDAR coordinates in the LiDAR information corresponding to the angle range to obtain a plurality of 2D LiDAR coordinates corresponding to the 3D LiDAR coordinates, wherein the processor projects the corresponding LiDAR data points onto the first image to form the second image according to the 2D LiDAR coordinates.

3. The map construction system according to claim 2, wherein in the operation of identifying the target objects in the first image,
the processor performs an image identification operation on the first image to identify the target objects which conform to a plurality of predetermined patterns from a plurality of image objects in the first image.

4. The map construction system according to claim 1, wherein in the operation of obtaining the respective object world coordinates of the target object base points according to the respective image coordinates of the target object base points, the LiDAR information, and the base world coordinate of the mobile vehicle,
the processor determines the selected target object to be a first type target object or a second type target object,
wherein in response to determining the selected target object to be the first type target object,
the processor transforms, according to a plurality of preset parameters and a plurality of image coordinates of a plurality of first type target object base points of the first type target object, the image coordinates into a plurality of relative coordinates, wherein the relative coordinates are configured to represent locations of the first type target object base points with respect to the image capturing device, and
the processor transforms the relative coordinates of the first type target object base points into the object world coordinates respectively corresponding to the first type target object base points according to the base world coordinate and the relative coordinates of the first type target object base points,
wherein in response to determining the selected target object to be the second type target object,
the processor transforms, according to a plurality of preset parameters, a plurality of image coordinates of a plurality of second type target object base points of the second type target object, and a plurality of pieces of depth information in the LiDAR information corresponding to the second type target object base points, the image coordinates into a plurality of relative coordinates, wherein the relative coordinates are configured to represent locations of the second type target object base points with respect to the image capturing device, and
the processor transforms the relative coordinates of the second type target object base points into the object world coordinates respectively corresponding to the second type target object base points according to the base world coordinate and the relative coordinates of the second type target object base points.

5. The map construction system according to claim 4, wherein the first type target object comprises one of the following objects:
a road;
a traffic marking; and
a ground traffic sign,
wherein the second type target object comprises one of the following objects:
a traffic signal;
a signboard; and
a building.

6. A map construction method, adapted for a map construction system disposed on a mobile vehicle, the map construction method comprising:
periodically detecting a base world coordinate corresponding to the mobile vehicle;
periodically capturing a first image of surroundings outside the mobile vehicle;
periodically obtaining LiDAR data of the surroundings outside the mobile vehicle;
identifying a plurality of target objects in the first image, and projecting a plurality of LiDAR data points onto the first image to obtain a second image according to the LiDAR data;
selecting one target object from the one or more target objects which have not been selected;
identifying a plurality of projected target LiDAR data points in the selected target object as a plurality of target object base points of the selected target object, and identifying an image coordinate of each of the target object base points;
obtaining a plurality of object world coordinates respectively corresponding to the target object base points according to the respective image coordinates of the target object base points, LiDAR information, and the base world coordinate; and
disposing the corresponding selected target object into a high definition map according to the object world coordinates.

7. The map construction method according to claim 6, wherein the LiDAR data comprise the LiDAR information corresponding to the LiDAR data points, wherein the step of projecting the LiDAR data points onto the first image to obtain the second image according to the LiDAR data comprises: performing a coordinate transformation operation on a plurality of 3D LiDAR coordinates according to an angle range of the first image with respect to an image capturing device of the map construction system and the 3D LiDAR coordinates in the LiDAR information corresponding to the angle range to obtain a plurality of 2D LiDAR coordinates corresponding to the 3D LiDAR coordinates; and projecting the corresponding LiDAR data points onto the first image to form the second image according to the 2D LiDAR coordinates.

8. The map construction method according to claim 7, wherein the step of identifying the target objects in the first image comprises:
performing an image identification operation on the first image to identify the target objects which conform to a plurality of predetermined patterns from a plurality of image objects in the first image.

9. The map construction method according to claim 6, wherein the step of obtaining the respective object world coordinates of the target object base points according to the respective image coordinates of the target object base points, the LiDAR information, and the base world coordinate of the mobile vehicle comprises:
determining the selected target object to be a first type target object or a second type target object,
wherein in response to determining the selected target object to be the first type target object, the step further comprises:
transforming, according to a plurality of preset parameters and a plurality of image coordinates of a plurality of first type target object base points of the first type target object, the image coordinates into a plurality of relative coordinates, wherein the relative coordinates are configured to represent locations of the first type target object base points with respect to an image capturing device of the map construction system; and transforming the relative coordinates of the first type target object base points into the object world coordinates respectively corresponding to the first type target object base points according to the base world coordinate and the relative coordinates of the first type target object base points, wherein in response to determining the selected target object to be the second type target object, the step further comprises:

transforming, according to a plurality of preset parameters, a plurality of image coordinates of a plurality of second type target object base points of the second type target object, and a plurality of pieces of depth information in the LiDAR information corresponding to the second type target object base points, the image coordinates into a plurality of relative coordinates, wherein the relative coordinates are configured to represent locations of the second type target object base points with respect to the image capturing device of the map construction system; and transforming the relative coordinates of the second type target object base points into the object world coordinates respectively corresponding to the second type target object base points according to the base world coordinate and the relative coordinates of the second type target object base points.

10. The map construction method according to claim 9, wherein the first type target object comprises one of the following objects:

a road;
a traffic marking; and
a ground traffic sign, wherein the second type target object comprises one of the following objects:

a traffic signal;
a signboard; and
a building.

* * * * *